(12) United States Patent
Dhanakshirur

(10) Patent No.: US 7,505,569 B2
(45) Date of Patent: Mar. 17, 2009

(54) DIAGNOSING VOICE APPLICATION ISSUES OF AN OPERATIONAL ENVIRONMENT

(75) Inventor: Girish Dhanakshirur, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 11/083,522

(22) Filed: Mar. 18, 2005

(65) Prior Publication Data

US 2006/0210025 A1 Sep. 21, 2006

(51) Int. Cl.
*H04M 11/00* (2006.01)
(52) U.S. Cl. .................. 379/88.14; 379/88.17; 704/246; 704/275; 704/277
(58) Field of Classification Search ............... 379/88.14, 379/88.17; 704/270, 275, 277
See application file for complete search history.

(56) References Cited

U.S. PATENT DOCUMENTS

| | | | | |
|---|---|---|---|---|
| 6,269,336 | B1 * | 7/2001 | Ladd et al. | 704/270 |
| 6,385,586 | B1 * | 5/2002 | Dietz | 704/277 |
| 6,501,832 | B1 * | 12/2002 | Saylor et al. | 379/88.04 |
| 6,507,643 | B1 * | 1/2003 | Groner | 379/88.14 |
| 6,539,078 | B1 | 3/2003 | Hunt et al. | |
| 6,766,294 | B2 | 7/2004 | MacGinite et al. | |
| 6,785,654 | B2 | 8/2004 | Cyr et al. | |
| 6,816,578 | B1 * | 11/2004 | Kredo et al. | 379/88.17 |
| 6,983,307 | B2 * | 1/2006 | Mumick et al. | 709/205 |
| 7,016,848 | B2 * | 3/2006 | St John Brittan et al. | 704/275 |

* cited by examiner

*Primary Examiner*—Fan Tsang
*Assistant Examiner*—Simon Sing
(74) *Attorney, Agent, or Firm*—Akerman Senterfitt

(57) ABSTRACT

A computerized method for diagnosing deployed voice-enabled application issues within a maintenance environment. The method can identify a recognition log file that includes details of previously occurring interactions of a voice-enabled application executing programmatic actions in an operational environment. The voice-enabled application can utilize a speech recognition service to convert utterances to text. Previously occurring interactions of the operational environment can be simulated in a maintenance environment. The maintenance environment can include a maintenance voice-enabled application component used in place of the voice-enabled application and can include a text-based speech recognition service used in place of the speech recognition service. The text-based speech recognition service can extract text from the recognition log file to simulate previously occurring utterance conversions performed by the speech recognition service without requiring the text-based speech recognition service to receive and convert utterances.

3 Claims, 3 Drawing Sheets

DIAGNOSING VOICE APPLICATION ISSUES OF AN OPERATIONAL ENVIRONMENT

BACKGROUND

1. Field of the Invention

The present invention relates to the field of network diagnostics, and, more particularly, to diagnosing voice application issues.

2. Description of the Related Art

Performing rapid and accurate speech processing tasks can require highly specialized, sophisticated, and resource robust hardware and software, especially when real-time or near real-time processing is desired and/or when speech processing tasks are performed for a diverse population having different speech characteristics. For example, in performing speech recognition tasks, received speech utterances have to be parsed into processable segments, each utterance segment has to be converted into a symbolic representation, these symbolic representations compared against valid words, and these words processed according to grammar rules and/or utterance contexts, where the resulting textual results can then be deciphered to determine what programmatic actions are to be taken responsive to the received speech input. Throughout this process, speaker-dependent characteristics, such as idiom, speaker language, accent, timber, and the like, can be determined and suitable adjustment can be made to more accurately perform speech processing tasks.

To efficiently perform these tasks within a distributed environment, a common practice is to establish various speech processing engines, like automatic speech recognition engines and text-to-speech conversion engines. Often these speech processing engines will be arranged as a cluster of speech processing engines that handle a high volume of speech processing tasks, each cluster consisting of numerous approximately identical engines where the processing load is balanced across the approximately equivalent engines of a cluster to assure each received task can be handled within acceptable performance constraints.

When voice-enabled applications require a speech processing task to be performed, the task is conveyed to the appropriate cluster and a result is returned to the requesting voice-enabled application. To efficiently utilize speech processing resources and to load-balance received tasks among various engines in a cluster, speech processing tasks can be handled in discrete and independent segments, called dialogue turns. Notably, different turn-based subtasks can be processed in parallel or in series by different ones of the speech engines of the cluster. Results of the subtasks can be combined into a task result, which is conveyed to the requesting voice-enabled application.

While the afore described structure can be highly efficient for handling a significant load for a large number of voice-enabled applications using a minimal amount of speech processing resources, it can be extremely difficult to diagnose problems within this complex and interdependent environment. That is, once an application is deployed into an operational environment, debugging problems in the field can consume time, skilled technician resources, and computing resources. Conventional approaches for diagnosing problems all have shortcomings.

One problem diagnosis technique, for example, is to establish component specific logs, each log recording the events that transpire. The highly interactive nature of this distributed, turn-based, operational environment, however, results in huge activity logs. Tracing these logs to diagnose problems is an extremely cumbersome process that requires logs of an application server to be compared with speech processing component logs, network traffic logs, and the like. Also, the process of extensively logging all activities in a comprehensive manner can require significant memory and can consume substantial processing resources, which can affect the runtime performance of the operational system.

When the speech-processing engine is a speech recognition engine, one of the most resource consuming aspects pertaining to event logging relates to speech utterances. That is, to be able to later re-create an operational scenario within a maintenance environment, one conventional approach to is record the audio files or speech utterances for each dialogue turn along with specific settings related to speech-recognizing these turn-based audio files. Audio files are extremely large files, which rapidly consume memory. For instance, a single hour of audio recording can fill a hard drive, which would otherwise be capable of storing months' worth of log information. What is needed is a way to recreate the conditions for diagnostic purposes that does not have the limitations of conventional techniques.

SUMMARY OF THE INVENTION

Subject matter disclosed within the present invention details a convenient, efficient, and effective technique of reproducing conditions of a complex voice-enabled operational environment that performs speech recognition tasks. Specifically, at least one log can be established within an operational environment that logs events sent to a speech recognition service, event-specific state information of the speech recognition, and results generated by the speech recognition engine. In one embodiment, the logs can be established on a session-by-session basis. In another embodiment, the information stored within the logs can be recorded on a per-turn basis. Importantly, the log can include textual information and need not include speech utterances that are processed by the speech recognition service. The logs can be conveyed to a maintenance environment for recreating operational scenarios. A text-based speech recognition service can extract information from these logs to simulate the behavior of the operational speech recognition service, even though the text-based speech recognition server is not provided with the speech-converted utterances. Accordingly, the maintenance environment can accurately reproduce operational conditions of a complex voice-enabled environment without incurring the overhead of logging speech-converted audio.

The present invention can be implemented in accordance with numerous aspects consistent with material presented herein. For example, one aspect of the present invention can include a computerized method for diagnosing deployed voice-enabled applications issues within a maintenance environment. The method can identify a recognition log file that includes details of previously occurring interactions of a voice-enabled application executing programmatic actions in an operational environment. The voice-enabled application can utilize a speech recognition service to convert utterances to text. Previously occurring interactions of the operational environment can be simulated in a maintenance environment. The maintenance environment can include a maintenance voice-enabled application component used in place of the voice-enabled application and can include a text-based speech recognition service used in place of the speech recognition service. The text-based speech recognition service can extract text from the recognition log file to simulate previously occurring utterance conversions performed by the speech recognition service without requiring the text-based speech recognition service to receive and convert utterances.

Another aspect of the present invention can include a text based recognition service component including an event receiving mechanism, a recognition log reading mechanism, and an event response mechanism. The event receiving mechanism can receive recognition requests originating from a voice browser. The recognition log reading mechanism can extract textual information from a recognition log file to simulate previously occurring utterance conversions. The event response mechanism can provide a response for each received recognition request based upon the extracted textual information. The text-based recognition service component can be a component of a maintenance environment used in place of a recognition service component of an operational environment. At least a portion of the extracted textual information can be information that was previously placed within the recognition log file by the recognition service component.

Still another aspect of the present invention can include a problem diagnostic method. The problem diagnostic method can use a session log to log events handled by a speech recognition service for a deployed voice application during a telephony session. For each logged speech conversion event, the session log can include at least one textual result and a corresponding confidence score for each textual result. In a maintenance environment that simulates the telephony session, a point in a telephony session simulation can be reached where the speech recognition service handled an event. At this point, an indication of the event can be conveyed to a replacement component for the speech recognition service. When the conveyed indication is a speech conversion event, the replacement component can extract information from the session log. The extracted data can be utilized within the maintenance environment as a simulation equivalent of results that were generated by the speech recognition service.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
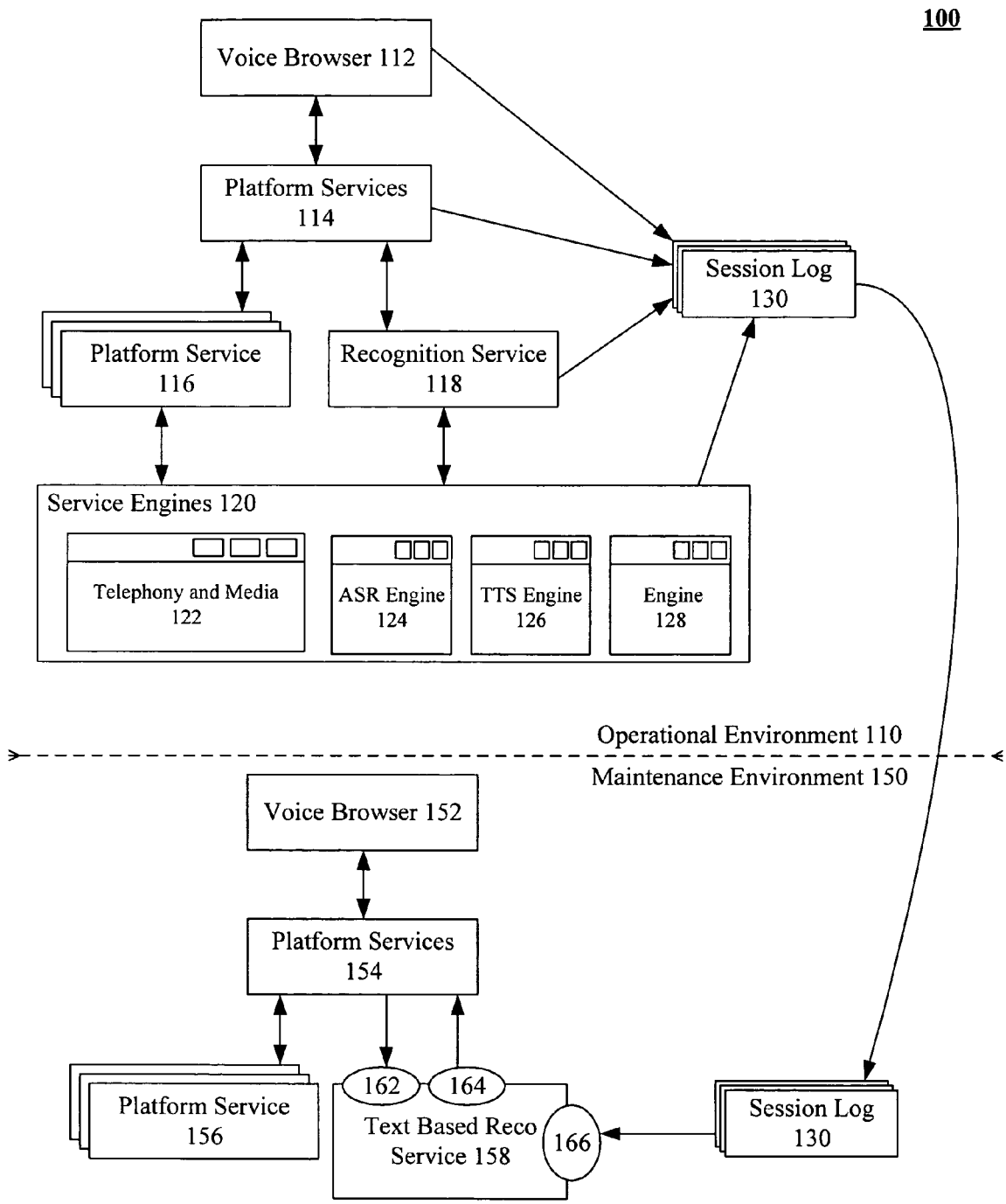
FIG. 1 is a schematic diagram illustrating a system for diagnosing problems in accordance with an embodiment of the inventive arrangements disclosed herein.

FIG. 1 is a schematic diagram illustrating a system 100 for diagnosing problems experienced within an operational environment 110 by simulating operational conditions existing at the time of the problem within a maintenance environment 150 in accordance with an embodiment of the inventive arrangements disclosed herein.

The operational environment 110 can include a voice browser 112 that utilizes platform services 114, such as platform service 116 and recognition service 118. In performing the services, the platform service 116 and/or the recognition service 118 can use one or more service engines 120, such as a telephony and media engine 122, an automatic speech recognition (ASR) engine 124, a text-to-speech engine 126, and other such engines 128.

The voice browser 112 can include a voice-enabled application that interprets voice markup languages to generate voice output and interpret voice input. As used herein, a voice markup language generally refers to a variety of voice-enabled languages including, but not limited to, a Voice extensible Markup Language (VoiceXML), a Speech Application Language Tags (SALT) language, an XML+Voice Profiles (X+V) language, a Speech Synthesis Markup Language (SSML), and other voice-enabled languages. In one embodiment, the voice browser 112 can operate in a centralized server or within a cluster of services that houses voice resources to handle voice-enabled markup, like VoiceXML-tagged content.

The maintenance environment 150 can contain component equivalents to the components of the operational environment 110. That is, voice browser 152, platform services 154, platform service 156, and text based recognition service 158 can correspond to voice browser 112, platform services 114, platform service 116, and recognition service 118, respectively. The equivalent components may not have exactly equivalent architectures and need not function in exactly the same manner as their operational equivalents. For example, the voice browser 112 can be implemented within a cluster in the operational environment, but the voice browser 152 that is the maintenance environment 150 equivalent can be a single component that simulates the behavior of the voice browser 112. Further, the voice browser 112 can be remotely located from platform services 114, yet voice browser 152 can be located within a device local to the platform services 154. In one embodiment, emulation technologies can be used to adapt the maintenance environment 150 to the operational environment 110 as closely as necessary for performing diagnostic operations. In another embodiment, one or more virtual machines or virtual operating environments can also be utilized within the maintenance environment 150 to simulate conditions of the operational environment 110.

Regardless of specific implementation details, the components of the maintenance environment 150 are designed to simulate operating conditions that occurred within the operational environment 110 so that simulations can be run. In this manner, problems experienced within the operational environment 110 can be replicated and analyzed at leisure in a non-production environment. Towards this end, the text based recognition service 158 can simulate operations of the recognition service 118, without receiving and speech-to-text converting utterances. As used herein utterances are digitally encoded audible files containing speech segments, which the recognition service 118 received and speech-to-text converted.

Instead of recording all the utterances processed by recognition service 118, which would consume vast amounts of memory, results of the utterance conversions and parameters involved in the utterance conversion are stored within session log 130. In this manner, text-based recognition service 158 can be looked at as a "black box" equivalent to the recognition service 118 capable of accepting approximately the same input and producing approximately the same output as the recognition service 118. Instead of receiving and utilizing utterances, however, an indication of the utterance is provided to the text based recognition service 158. Instead of processing the utterance, the text based recognition service 158 can extract text from session log 130. This simulation not only saves memory space that would otherwise be needed to store utterances, but also saves processing resources, like CPU cycles.

The text based recognition service 158 can include an event receiving mechanism 162, an event response mechanism 164, and a recognition log reading mechanism 166, each of which help the text based recognition service 158 to operate. The event receiving mechanism 162 can be configured to receive recognition requests originating from a voice browser 152. In one embodiment, the requests can be processed by platform services 154 before being sent to the event receiving mechanism 162. In another embodiment, the event receiving mechanism 162 can utilize event indicators and other data extracted from the session log 130 to interpret received recognition requests. The extracted information can be information that was previously placed within the session log by the voice browser 112, platform services 114, recognition services 118, and/or other deployed network elements, software agents, applications, monitoring routines, and the like.

The event response mechanism 164 can be configured to provide a response for each received recognition request based upon the extracted textual information from session log 130, which can be processed, interpreted, and transformed by the text-based recognition service 158. The recognition log reading mechanism 166 can extract textual information from the session log 130. This extraction can involve sequentially reading information from a file, performing database queries against an information store, searching indexed information for desired data elements, and other information extraction techniques.

Mechanisms 162, 164, and 166 can include software, firmware, or hardware instructional code readable by the text-based recognition service 158 to perform the functions indicated above. Any of a variety of different programming languages and programming techniques that are known in the art can be utilized for implementing mechanisms 162, 164, and 166, which are not to be limited to any particular coding methodology or set of coding techniques.

The activities and operations performed within system 100 by components of system 100 can be more completely and comprehensively understood through an illustrative example. In operation, the voice browser 112 can fetch a voice markup document and begin programmatic actions based upon the fetched document. When a recognition action is required, the voice browser 112 can request a recognition service from the platform services 114, which can notify the recognition service 118. The voice browser 112 or other utterance receiving media component can convey a speech utterance to the recognition service 118 that is to be speech-to-text converted. The recognition notification event and utterance input event can be recorded in the session log 130.

The recognition service 118 can speech recognize the received utterance and can utilize ASR engine 124 to perform the speech-to-text conversion operations. When converting the utterance, one or more textual results can be generated, each having a corresponding confidence score. In one embodiment, the n-best textual results can be generated, for example. When multiple textual results are generated, the result having the highest confidence score can be the selected or preferred textual result, with each other result being an alternative textual result. The recognition service 118 and/or the ASR engine 124 can record the one or more textual results, associated confidence scores, and other relevant recognition events or parameters to the session log 130.

For example, the session log file 130 can be formatted as indicated below.

```
UEve_100010001000.log
    #User Event File
    boston: 72; austin: 65;
    No_Input;
    good bye: 68; i fry 22; we try 18; that's high 09;
END EVENT FILE
```

As shown, a line can be included within the event file for each event sequentially processed by the voice browser 112 during a session. Each speech conversion event can include one or more returned textual results along with a related confidence score. The invention is not to be construed as limited to the format expressed above, which is one or many possible formats for a session log 130 that is included herein for illustrative purposes only. For instance, in another embodiment, additional event indicating notations can be included within the session log file 130. In still another embodiment, the session log file 130 can be organized within an indexed data structure, such as a database structure.

Regardless of how the session log file 130 is organized, after, before, or simultaneous to data being written to the session log file 130, the results from the recognition service 118 can also be conveyed to the voice browser 112. The described process can continue throughout an interactive session involving the voice browser 112. During the session, the voice browser 112, or other voice-enabled application interfacing with the voice-browser 112, can encounter a problem resulting in the session being prematurely terminated. This problem can be reported and conveyed to suitable administrative personnel, who can simulate the activities leading up to the problem within the maintenance environment 150 using information contained within the session log 130.

Specifically, in the maintenance environment 150, a simulated session based upon a previously occurring operational session can be initiated. The voice browser 152 can request an utterance conversion. Upon receiving the request, which may not include an input utterance, the text based recognition service 158 can access the session log 130. In embodiment where utterance input is conveyed to the text-based recognition service 158, the utterance input can be discarded or otherwise ignored by the text based recognition service 158. The text-based recognition service 158 can convey suitable request results to the voice browser 152.

The simulated session can progress forward and/or backward in time, as directed by an administrator. Alternately, the simulated session can be executed and automatically halted at a stage where an error was detected. During any point in the simulation, the administrator can examine state information, event occurrences, variable values, and the like. Further, the administrator can alter environment 150 information in an attempt to correct the error and can re-run the simulation using the altered information.

It should be appreciated that the arrangements shown in FIG. 1 are for illustrative purposes only and that the invention is not strictly limited in this regard. For example, the invention disclosed herein is not limited to the use of voice-browsers, like voice browser 112, but can instead be applied to any voice-enabled application, which utilizes one or more recognition service 118 to perform speech recognition operations. The various browsers, logs, services, and engines of system 100 can be implemented in a distributed or centralized fashion.

For example, while it is typical for speech processing service engines 120 to be arranged as a cluster of engines, non-clustered architectures, like an architecture consisting of a discrete, stand-alone speech processing engines, are also contemplated herein. Additionally, the functionality attributable to the various components of system 100 can be combined or separated in different manners than those illustrated herein. For instance, the platform services 114 and the recognition service 118 can be implemented as a single integrated component in one embodiment of the present invention. In another embodiment of the present invention, the session log 130 can be implemented within a plurality of separate logs. In still another embodiment of the present invention, the session log 130 can log information for multiple sessions within a single file or data storage space. Such an embodiment can include a mechanism to query the data storage space by session or can include a mechanism to extract session-specific log information.

It should be emphasized that the session log 130 can record events, conditions, and other state information as activities are performed within the operational environment 110. The session log 130 can include session-specific information or can include session-agnostic information. In one embodiment, the session log 130 can be constructed from pre-existing operational logs after the occurrence of an operational problem.

In such an embodiment, one or more scripts can be executed to parse out existing log files for a session and to associate the parsed log information with recognition events. After extracting information from pre-existing logs, the gathered information can be formatted in an appropriate manner and the session log 130 can be constructed. The ability to generate a session log 130 from pre-existing information can be very useful in situations where an large operational infrastructure exist, which needs to be maintained, since dynamically constructing session logs 130 from pre-existing infrastructure logs permits a business to utilize the benefits from maintenance environment 150, without incurring substantial new operating costs.

For example, the existing Web Sphere Voice Response (R) platform from International Business Machines, Incorporated (IBM) of Armonk, N.Y., does not currently include a text-based platform, but a text based VoiceXML simulator could be added to the platform, thereby permitting the platform to advantageously utilize the concepts disclosed herein without dramatically altering the operational infrastructure of the platform.

Figure 2:
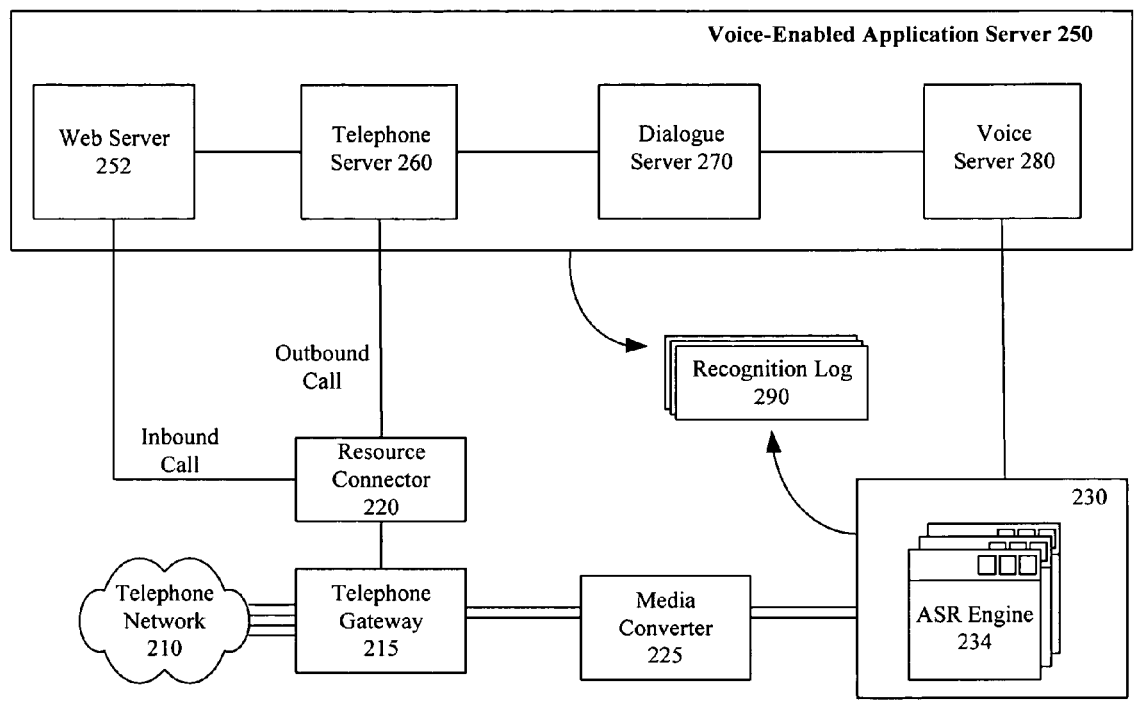
FIG. 2 is a schematic diagram illustrating a system for a deployed voice-enabled application that records events and speech recognition data to a recognition log in accordance with an embodiment of the inventive arrangements disclosed herein.

FIG. 2 is a schematic diagram illustrating a system 200 for a deployed voice-enabled application that records events and speech recognition data to a recognition log 290. In one embodiment, the recognition log 290 can be structured similar to session log 130 of system 100. Accordingly, recognition log 290 could be used by maintenance environment 150 to simulate operational conditions of system 200. The system 200 shows one potential architecture of an operational environment, such as operational environment 110, in which the inventive arrangements detailed herein can be enacted. The system 200 is not to be limited to implementation details provided for operational environment 110, however, and can be performed in the context of any operational system including a voice-enabled application server that records information in recognition log 290 for diagnostic purposes.

System 200 illustrates a turn-based operational environment in which voice processing tasks occur. More specifically, system 200 shows an architecture for an interactive voice response (IVR) system capable of interfacing with users connected via a telephone network 210. For example, the voice-enabled application server 250 can be a server for an automated call center application that interfaces with users via voice-based telephone sessions. Recognition log 290 can record data pertaining to speech recognition events, results, operational states, system parameters, variable values, and external system 200 conditions. This recorded information can be used to simulate conditions of the operational environment within a maintenance environment, such as maintenance environment 150. In one embodiment, a plurality of recognition logs 290 can be kept, each logging data pertaining to a particular interactive session between a user and the IVR system.

The system 200 can include a telephone gateway 215, one or more speech engines 230, and a telephony application server 250. The telephone gateway 215 can include hardware and/or software that translates protocols and/or routes calls between a telephone network 210, such as a Public Switched Telephone Network (PSTN), and the application server 250. The telephone gateway 215 can route calls using packet-switched as well as circuit switched technologies. Further, the telephone gateway 215 can contain format converting components, data verification components, and the like. For example, the telephone gateway 215 can include a CISCO 2600 series router from Cisco Systems, Inc. of San Jose, Calif., a Cisco, a CISCO 5300 series gateway, a Digital Trunk eXtended Adapter (DTXA), an INTEL DIALOGIC® Adaptor from Intel Corporation of Santa Clara, Calif., and the like.

The speech engines 230 can include one or more automatic speech recognition engines 234, one or more text to speech engines (not shown), and other media resources. Particular ones of the speech engines 230 can include one or more application program interfaces (APIs) for facilitating communications between the speech engine 230 and external components. For example, in one embodiment, the ASR engine 234 can include an IBM ASR engine with an API such as SMAPI. Selective ones of the speech engines 230 can include a control interface for interfacing with the application server 250.

The application server 250 can include an engine that functions as a reliable foundation for handling high volume secure transactions and Web services. In one embodiment, the application server 250 can include a Websphere (R) Application Server (WAS). The application server 250 can also include a multitude of component servers, such as telephone server 260, dialogue server 270, and voice server 280, communicatively linked via one or more Web servers 252. Each Web server 252 can include one or more plug-ins, where each plug-in can include routines for conveying data to particular component servers within the application server 250. Each of the component servers of the application server 250 can be components implemented within a Virtual Machine, such as virtual machines adhering to the J2EE specification or other similar and/or derivative specification.

The telephone server 260 can control the setup, monitoring, and tear down of phone calls. The dialogue server 270 can manage tasks relating to call dialogue for the application server 250. The dialogue server 270 can include a voice browser, such as the voice browser 112 illustrated in FIG. 1. The voice server 280 can handle one or more speech services for the application server 250. It should be appreciated that the telephone server 260, the dialogue server 270, and the voice server 280 can be arranged in a multitude of fashions and that the invention is not to be limited to the illustrative arrangement presented herein.

The system 200 can also include a media converter 225 and a resource connector 220. The media converter 225 can be a communication intermediary for streaming speech data configured to resolve protocol issues between the telephone gateway 215 and speech engines 230. Audio data can be streamed bi-directionally between the telephone gateway 215 and the speech engines 230 as appropriate. The resource connector 220 can be a communication intermediary between the telephone gateway 215 and the application server 250 and/or media converter 225 that allocates resources for calls. In one embodiment, the resource connector 220 can normalize a telephony request into a request that is acceptable by the application server 250, thereby providing a generic means for the telephone gateway 215 to interface with the application server 250. For example, if the application server 250 communicates using HTTP messages, the resource connector 220 can convert a telephony request into an appropriate HTTP message. In another example, if the application server 250 utilizes a Session Initiation Protocol (SIP), the resource connector 220 can convert a telephony request into an appropriate SIP message.

In operation, a user can initiate a telephone call. The call can be conveyed through a telephone network 210 and can be received by the telephone gateway 215. The telephone gateway 215 can convey call information to the resource connector 220. The resource connector 220 can convey call identifying information to the application server 250. Telephone session specific actions can then be taken by the voice-enabled application server 250. These server 250 actions can involve the voice-server 280 processing turn-segmented tasks for the dialogue server 270 and returning results for each processed task. In processing the tasks, the voice server can utilize the ASR engine 234. The ASR engine 234 once initiated, can receive utterances as input, which are conveyed over the telephone network 210 through the telephone gateway 215 and through the media converted 225 to be received by the ASR engine 234. Throughout this process, the ASR engine 234 and voice-enabled application server 250 can record information in the recognition log 290 as appropriate.

Figure 3:
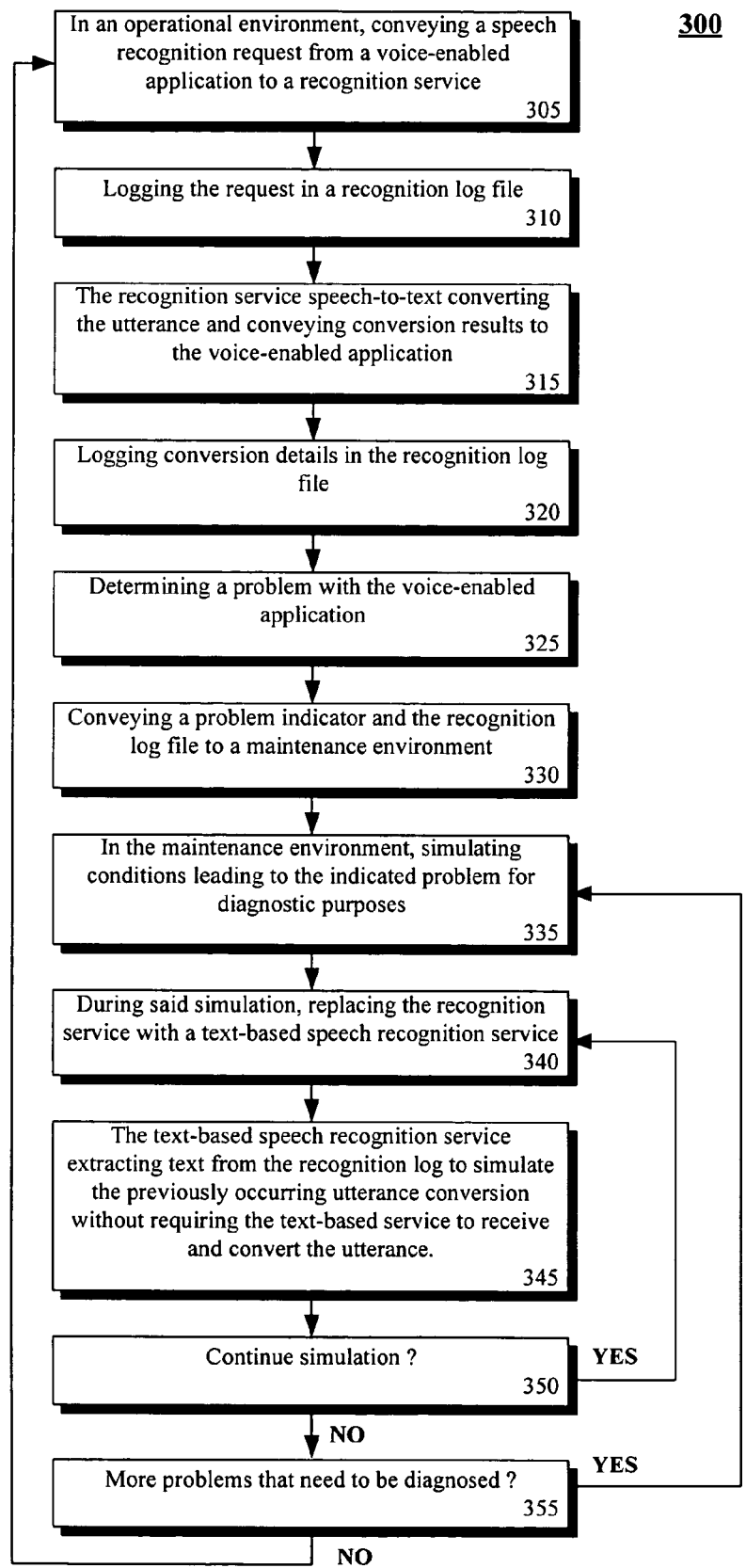
FIG. 3 is a flow chart of a method for diagnosing voice application issues in accordance with an embodiment of the inventive arrangements disclosed herein.

FIG. 3 is a flow chart of a method 300 for diagnosing voice application issues in accordance with an embodiment of the inventive arrangements disclosed herein. In one embodiment, the method 300 can be performed in the context of system 100. In another embodiment, the operational environment in which method 300 is performed can be the environment shown in system 200. Method 300 is not to be limited in this regard, however, and can be implemented in the context of any voice-enabled application deployed in an operational environment.

The method 300 can begin in an operational environment in step 305, where a speech recognition request can be conveyed from a voice-enabled application to a recognition service. The recognition service can also be conveyed an utterance, which may come from a different source other than the voice-enabled application or may come directly from the voice-enabled application. In step 310, the request can be logged in a recognition log file. In step 315, the recognition service can convert the utterance into one or more textual results. These results can be conveyed to the voice-enabled application that made the conversion request. In step 320, conversion details can be logged into the recognition log file. The conversion details can include one or more textual results as well as corresponding confidence scores. For example, the n-best list of textual results and confidence scores can be logged.

In step 325, a problem can be determined with the voice-enabled application. This problem can, for instance, result in a telephone session being prematurely terminated. In step 330, a problem indicator can be conveyed to a maintenance environment along with the recognition log file. In one embodiment, the recognition log file can be a session-specific file constructed during the session that experienced problems. In another embodiment, the recognition log file can be generated from pre-existing log information. Further, the recognition log file may not be an actual file that is conveyed to the maintenance environment, but can instead be a data store containing information accessible from the maintenance environment. For example, the recognition log file can represent database entries related to the operational session that can be generated responsive to a query conveyed from the maintenance environment.

In step 335 in the maintenance environment, conditions leading to the indicated problem can be simulated for diagnostic purposes. In step 340, during the simulation the speech recognition service can be replaced with a text-based speech recognition service. In step 345, the text-based speech recognition service can extract text from the recognition log to simulate the previously occurring utterance conversion that occurred in the operational environment. The simulated conversion activities do not require the text-based speech recognition service to receive and speech-to-text convert the utterance. In step 350, a determination can be made as to whether the simulation should be allowed to continue. If it does continue, the method can loop from step 350 to step 340. If the simulation is not to continue, the method can proceed from step 350 to step 355.

In step 355, a determination can be made as to whether more problems identified as occurring within the operational environment are to be diagnosed. If so, the method can loop to step 335, where the conditions leading to the new problem can be simulated. Otherwise, the method can proceed from step 355 to step 305, where new operational environment actions can be taken, which can be logged within the recognition log file.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computerized method for diagnosing deployed voice-enabled application issues within a maintenance environment comprising the steps of:
    identifying a recognition log file that includes details of previously occurring interactions of a voice-enabled application executing programmatic actions in an operational environment, said voice-enabled application utilizing a speech recognition service to convert utterances to text, wherein said recognition log file is a session-specific log file and wherein the previously occurring interactions are interactions of a communication session involving a user and the voice-enabled application, and wherein the speech recognition service performs utterance conversions for a plurality of applications and conveys tasks to a cluster of automated speech recognition engines, which are used to perform the utterance conversions;
    simulating said previously occurring interactions in a maintenance environment, said maintenance environment including a maintenance voice-enabled application component used in place of the voice-enabled application and including a text-based speech recognition service used in place of the speech recognition service;
    said text-based speech recognition service extracting text from the recognition log file to simulate previously occurring utterance conversions performed by the speech recognition service without requiring the text-based speech recognition service to receive and convert utterances;
    in the operational environment, detecting a technical problem during the communication session, and responsive to the detecting, automatically conveying the session-specific log file along with a problem indication to the maintenance environment.

2. A text based recognition service component comprising:
    a event receiving mechanism configured to receive recognition requests originating from a voice browser;
    a recognition log reading mechanism configured to extract textual information from a recognition log file to simulate previously occurring utterance conversions; and
    an event response mechanism configured provide a response for each received recognition request based upon the extracted textual information, wherein the text-based recognition service component is a component of a maintenance environment used in place of a recognition service component of an operational environment, wherein at least a portion of the extracted textual information was previously placed within the recognition log file by the recognition service component
    wherein the recognition log file is a session log for an interaction session involving a user and the voice browser, wherein the voice browser interfaces with a speech recognition service in a manner determined by voice-based markup code, and wherein the speech recognition service performs tasks on a per-turn basis, and wherein the recognition log file includes an entry for each turn.

3. A problem diagnostic method comprising the steps of:
    in a session log, logging events handled by a speech recognition service for a deployed voice application during a telephony session, for each logged speech conversion event, said session log including a plurality of textual results, comprising a selected textual result and at least one alternative textual result, and a corresponding confidence score for each textual result, wherein said speech recognition service performs tasks on a per-turn basis, wherein the session log includes an entry for each turn, and wherein said plurality of textual results includes the n-best results generated for each utterance, the n of the n-best results being a parameter for the number of text results returned per utterance conversion and said n-best results being those results having greatest relative confidence scores;
    in a maintenance environment that simulates the telephony session, reaching a point in a telephony session simulation where the speech recognition service handled an event;
    conveying an indication of the event to a replacement component for the speech recognition service;
    when the conveyed indication is a speech conversion event, said replacement component extracting from the session log the at least one textual result and corresponding confidence score associated with the speech conversion event; and
    utilizing the extracted data from the session log within the maintenance environment as a simulation equivalent of results that were generated by the speech recognition service.

* * * * *